US012057060B1

(12) United States Patent
Lin et al.

(10) Patent No.: US 12,057,060 B1
(45) Date of Patent: Aug. 6, 2024

(54) DISPLAY DEVICE

(71) Applicant: AUO Corporation, Hsinchu (TW)

(72) Inventors: Chun-Liang Lin, Hsinchu (TW); Yu-Syuan Lin, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/363,770

(22) Filed: Aug. 2, 2023

(30) Foreign Application Priority Data

May 8, 2023 (TW) ................................ 112117051

(51) Int. Cl.
*G09G 3/32* (2016.01)

(52) U.S. Cl.
CPC ....... *G09G 3/32* (2013.01); *G09G 2320/0666* (2013.01)

(58) Field of Classification Search
USPC ............................................................ 345/76
See application file for complete search history.

(56) References Cited

U.S. PATENT DOCUMENTS 9,983,439 B2 5/2018 Mizunuma et al.
2016/0380169 A1* 12/2016 Yun .......................... F21V 3/02 257/98
2017/0003548 A1 1/2017 Mizunuma et al.
2017/0069611 A1 3/2017 Zhang et al.
2017/0242161 A1 8/2017 Zhang et al.
2018/0006093 A1* 1/2018 Kim ...................... G03F 7/0007
2019/0148459 A1 5/2019 He et al.
2019/0157354 A1* 5/2019 Lee ...................... H10K 59/351
2021/0111319 A1 4/2021 Lutgen et al.
2021/0159373 A1 5/2021 Grundmann
2021/0183827 A1* 6/2021 Maegawa ........... H01L 25/0753
2021/0333441 A1* 10/2021 Schwartz ............. G06V 10/147
2021/0384467 A1* 12/2021 Park ..................... H10K 50/115
2021/0391497 A1 12/2021 Ben Bakir et al.
2022/0037622 A1 2/2022 Cai
2022/0310976 A1* 9/2022 Lee ...................... H10K 59/877
2023/0102623 A1* 3/2023 Jeong ................. H10K 59/8722 257/91
2023/0135465 A1* 5/2023 Murugan ................ H01L 33/60 257/91

FOREIGN PATENT DOCUMENTS

CN 101383341 3/2009
CN 106324890 1/2017
(Continued)

*Primary Examiner* — Chineyere D Wills-Burns
(74) *Attorney, Agent, or Firm* — JCIPRNET

(57) ABSTRACT

A display device includes a circuit substrate, a light emitting diode, an encapsulation layer, a color conversion layer and a first optical structure. The light emitting diode is located on the circuit substrate. The encapsulation layer covers the light emitting diode. The color conversion layer overlaps the light emitting diode. The first optical structure overlaps the color conversion layer and is located between the encapsulation layer and the color conversion layer. The first optical structure includes first gaps periodically arranged with a first pitch on a first direction. The width of each first gap in the first direction is 1 micrometer to 10 micrometers. A refractive index of a material of the first optical structure is greater than a refractive index of a material of the encapsulation layer.

20 Claims, 5 Drawing Sheets

(56) References Cited

FOREIGN PATENT DOCUMENTS

| | | |
|---|---|---|
| CN | 108962951 | 12/2018 |
| CN | 113517414 | 10/2021 |
| CN | 115132783 | 9/2022 |
| CN | 115312579 | 11/2022 |
| CN | 115548233 | 12/2022 |
| WO | 2013054226 | 4/2013 |

* cited by examiner

DISPLAY DEVICE

CROSS-REFERENCE TO RELATED APPLICATION

This application claims the priority benefit of Taiwan application serial no. 112117051, filed on May 8, 2023. The entirety of the above-mentioned patent applications is hereby incorporated by reference herein and made a part of this specification.

BACKGROUND

Technical Field

The invention relates to a display device.

Description of Related Art

Light-emitting diodes (LEDs) are electroluminescent semiconductor devices. They possess advantages such as high efficiency, long lifespan, durability, fast response time, and high reliability. Therefore, they are commonly used in display devices. With significant investments of time and money, the related technologies of LED display devices have been continuously developed, leading to improved performance of the LED display devices year by year. However, increasing the luminous efficiency and color purity of LED display devices remains a challenging research topic for many developers.

SUMMARY

At least one embodiment of the present invention provides a display device, which includes circuit substrate, LED, encapsulate layer, color conversion layer and first optical structure. The LED is located on the circuit substrate. The encapsulate layer covers the LED. The color conversion layer overlaps the LED. The first optical structure overlaps the color conversion layer and is located between the encapsulate layer and the color conversion layer. The first optical structure includes multiple first gaps arranged periodically with first pitch on the first direction. The width of each first gap in the first direction is 1 micrometer to 10 micrometers. The refractive index of the material of the first optical structure is greater than that of the material of the encapsulate layer.

At least one embodiment of the present invention provides a display device, which includes circuit substrate, LED, encapsulate layer, covering layer, color conversion layer and first optical structure. The LED is located on the circuit substrate. The encapsulate layer covers the LED. The covering layer is located on the encapsulate layer. The color conversion layer overlaps the LED. The first optical structure overlaps the color conversion layer and is located between the covering layer and the color conversion layer. The first optical structure includes multiple first gaps arranged periodically with first pitch on the first direction. The width of each first gap in the first direction is 1 micrometer to 10 micrometers. The refractive index of the material of the first optical structure is greater than that of the material of the covering layer.

DESCRIPTION OF THE EMBODIMENTS

Figure 1:
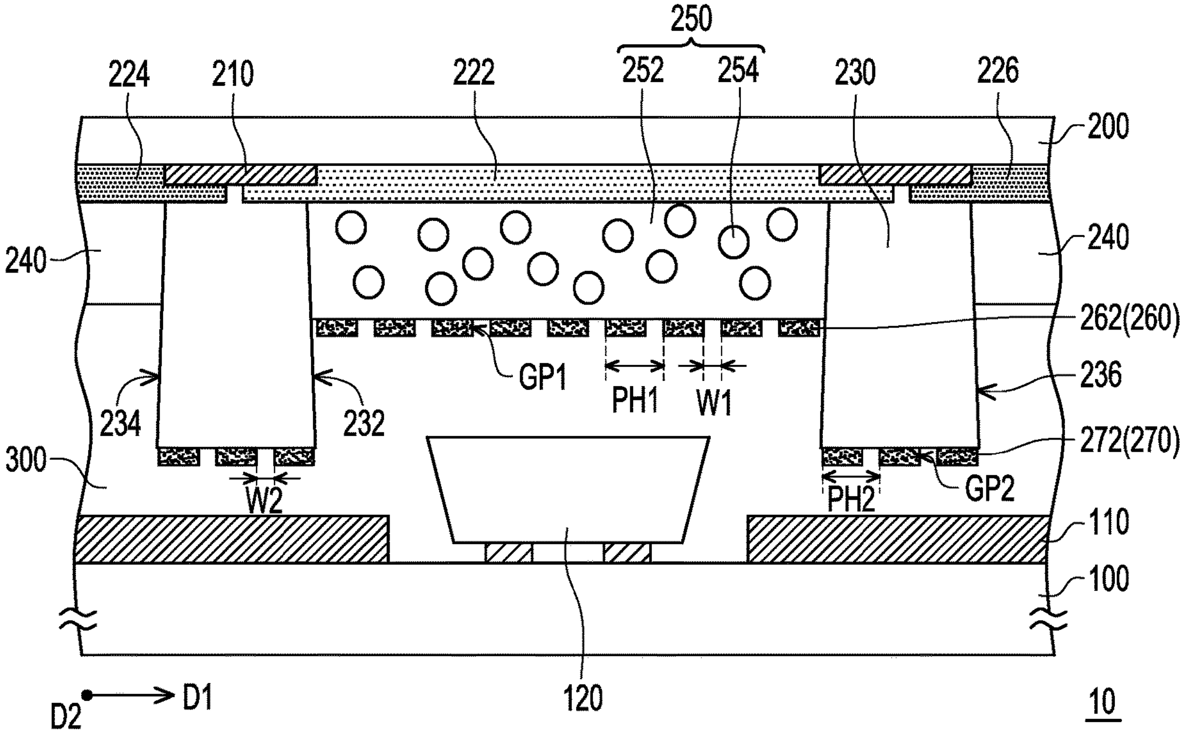
FIG. 1 is a schematic cross-sectional view of a display device of an embodiment according to the present invention.

FIG. 1 is a schematic cross-sectional view of a display device of an embodiment according to the present invention. Referring to FIG. 1, a display device 10 includes a circuit substrate 100, an LED 120, an encapsulate layer 300, a color conversion layer 250 and a first optical structure 260. In this embodiment, the display device 10 further includes a black matrix 110, an opposite substrate 200, a light-shielding layer 210, a first color filter element 222, a second color filter element 224, a third color filter element 226, a bank structure 230, a light-transmitting layer 240, and a second optical structure 270.

The circuit substrate 100 includes, for example, a substrate and a circuit structure on the substrate. In some embodiments, the aforementioned circuit structure includes thin film transistors, signal lines, and other electronic components.

The black matrix 110 is located on the circuit substrate 100. The black matrix 110 includes, for example, black resin, black metal, black oxide or other suitable materials. The LED 120 is located on the circuit substrate 100 and surrounded by the black matrix 110. In other words, the black matrix 110 has an opening, and the LED 120 is arranged in the aforementioned opening. The LED 120 can be a horizontal type LED, a vertical type LED or other types of LEDs. In some embodiments, LED 120 is a red LED, a green LED or a blue LED. In some embodiments, after the LED 120 is formed on a growth substrate, the LED 120 is transferred to the circuit substrate 100 through one or more transfer processes.

The encapsulate layer 300 covers the LED 120 and the black matrix 110. In this embodiment, the encapsulate layer 300 surrounds the LED 120. In some embodiments, the material of the encapsulate layer 300 includes photoresist, resin, silicone or other suitable material, and its refractive index is 1.2 to 1.6.

The opposite substrate 200 overlaps the circuit substrate 100. In some embodiments, the material of the opposite substrate 200 may be glass, quartz, organic polymer or other applicable materials.

The light shielding layer 210, the first color filter element 222, the second color filter element 224 and the third color filter element 226 are located between the opposite substrate 200 and the circuit substrate 100. In this embodiment, the light shielding layer 210, the first color filter element 222, the second color filter element 224 and the third color filter element 226 are formed on the opposite substrate 200. In some embodiments, the first color filter element 222, the second color filter element 224, and the third color filter element 226 respectively include filter elements of different colors (for example, include a red filter element, a blue filter element, and a green filter element). The light shielding layer 210 is disposed between the filter elements of different colors.

The bank structure 230 is disposed between the opposite substrate 200 and the circuit substrate 100. In this embodiment, the bank structure 230 is formed on the light shielding layer 210, the first color filter element 222, the second color filter element 224 and the third color filter element 226, but the invention is not limited thereto. In other embodiments, a protective layer (such as silicon oxide, silicon nitride, silicon oxynitride or other suitable material) is formed on the first color filter element 222, the second color filter element 224 and the third color filter element 226, and then the bank structure 230 is formed on the protective layer.

In some embodiments, the bank structure 230 includes a transparent material and reflective particles dispersed in the aforementioned transparent material. The volume percentage of the reflective particles in the bank structure 230 is, for example, 1 v % to 30 v %, and the size of the reflective particles is, for example, 100 nm to 500 nm. In some embodiments, the refractive index of the transparent material in the bank structure 230 is greater than 1.5 to 1.6, and the refractive index of the reflective particles is less than 1.46 (such as silicon dioxide). In some embodiments, the refractive index of the transparent material in the bank structure 230 is 1.45 to 1.6, and the refractive index of the reflective particles is greater than 1.6 (such as aluminum oxide or titanium dioxide).

In this embodiment, the area of the bank structure 230 on the side near the opposite substrate 200 is smaller than the area of the bank structure 230 on the side near the circuit substrate 100. In other words, the bank structure 230 has a structure with a narrow top and a wide bottom, but the present invention is not limited thereto. In other embodiments, the area of the bank structure 230 on the side near the opposite substrate 200 is greater than or equal to the area of the bank structure 230 on the side near the circuit substrate 100.

The bank structure 230 has a plurality of openings 232, 234, 236. The opening 232, opening 234, and opening 236 overlap the first color filter element 222, the second color filter element 224, and the third color filter element 226, respectively.

The color conversion layer 250 is located in the opening 232 of the bank structure 230 and overlaps the LED 120. The bank structure 230 surrounds the color conversion layer 250. The color conversion layer 250 includes a base material 252 and a color conversion material 254 dispersed in the base material 252. The color conversion material 254 is, for example, a quantum dot material, a fluorescent material, a phosphorescent material, a perovskite material or other suitable materials such as luminescent dyes. In some embodiments, the color conversion layer 250 has a thickness of 8 micrometers to 16 micrometers.

The color conversion layer 250 is used to absorb the light emitted by the underlying LED 120, and convert the aforementioned light into light of other colors. For example, the LED 120 located below the color conversion layer 250 is a blue LED or a green LED, and the color conversion layer 250 is configured to convert blue light or green light into red light, and the first color filter element 222, for example, is a red filter element that allows red light to pass through. In other embodiments, the LED 120 located below the color conversion layer 250 is a blue LED or a red LED, and the color conversion layer 250 is configured to convert blue light or red light into green light, and the first color filter element 222, for example, is a green filter element that allows green light to pass through. In other embodiments, the LED 120 located below the color conversion layer 250 is a green LED or a red LED, and the color conversion layer 250 is configured to convert green light or red light into blue light, and the first color filter element 222, for example, is a blue filter element that allows blue light to pass through.

The transparent insulating layer 240 is located in the openings 234, 236 of the bank structure 230. The bank structure 230 surrounds the transparent insulating layer 240. In some embodiments, other LEDs (not shown) are disposed between the transparent insulating layer 240 and the circuit substrate 100. For example, the light emitted by the LED below the opening 234 can pass through the encapsulate layer 300, the transparent insulating layer 240 and the second color filter element 224, and the light emitted by the LED below the opening 236 can pass through the encapsulate layer 300, the transparent insulating layer 240 and the third color filter element 226. In some embodiments, the LED below the opening 234 and the LED below the opening 236 are LEDs of different colors.

In some embodiments, the material of the transparent insulating layer 240 includes resin or other suitable materials. In some embodiments, the material of the transparent insulating layer 240 has a refractive index of 1.4 to 1.6. In some embodiments, there is a scattering material included in the transparent insulating layer 240. For example, the transparent insulating layer 240 includes a plurality of scattering particles dispersed therein, such as titanium dioxide or other suitable materials.

The first optical structure 260 overlaps the color conversion layer 250 and is located between the encapsulate layer 300 and the color conversion layer 250. The refractive index of the material of the first optical structure 260 is greater than the refractive index of the material of the encapsulate layer 300. In some embodiments, the material of the first optical structure 260 has a refractive index of 1.7 to 2.6. In some embodiments, the material of the first optical structure 260 is a transparent material, such as indium tin oxide, zirconia or other suitable materials. In some embodiments, the first optical structure 260 has a thickness of 0.1 micrometer to 1 micrometer.

The first optical structure 260 includes a plurality of first gaps GP1 periodically arranged on the first direction D1 with the first pitch PH1. The width W1 of each first gap GP1 on the first direction D1 is 1 micrometer to 10 micrometers. In this embodiment, the first optical structure 260 includes a plurality of first optical units 262 periodically arranged on the first direction D1, and the first gaps GP1 are located between adjacent first optical units 262. In some embodiments, the width of each first optical unit 262 on the first direction D1 (that is, the first pitch PH1 minus the width W1) is 1 micrometer to 10 micrometers. In some embodiments, the first surfaces of the first optical units 262 facing the color conversion layer 250 are flat surfaces, and the second surfaces of the first optical units 262 facing the circuit substrate 100 are flat surfaces. The first optical units 262 have a uniformly distributed thickness.

In this embodiment, the encapsulate layer 300 fills the first gaps GP1. In some embodiments, the encapsulate layer 300 contacts the color conversion layer 250 through the first gaps GP1.

Through the design of a plurality of first gaps GP1 arranged periodically, diffraction phenomena occur at the first optical structure 260 when light emitted by the LED 120 is transmitted. Therefore, it allows the light emitted by the LED 120 to be more completely converted into a different color by the color conversion layer 250, thus improving the issue of light leakage caused by the direct transmission of light through the color conversion layer 250. Based on the above, it is not necessary to make the color conversion layer 250 very thick in order to completely convert the light emitted by the LED 120 into the intended color. This enables the color conversion layer 250 to be thinner, resulting in material cost savings.

In this embodiment, the black matrix 110 is located between the circuit substrate 100 and the bank structure 230, and there is a gap between the bank structure 230 and the black matrix 110. In order to prevent the light emitted by the LED 120 from directly passing through the gap between the bank structure 230 and the black matrix 110, the second optical structure 270 is arranged between the bank structure 230 and the black matrix 110.

The material of the second optical structure 270 has a higher refractive index than the material of the encapsulate layer 300. In some embodiments, the material of the second optical structure 270 has a refractive index of 1.7 to 2.6. In some embodiments, the material of the second optical structure 270 is a transparent material, such as indium tin oxide, zirconia or other suitable materials. In some embodiments, the second optical structure 270 has a thickness of 0.1 micrometer to 1 micrometer. In some embodiments, the first optical structure 260 is formed simultaneously with the second optical structure 270.

The second optical structure 270 includes a plurality of second optical units 272 periodically arranged with a second pitch PH2 on the first direction D1, and the second gaps GP2 are located between adjacent second optical units 272. In some embodiments, it can also be stated that the second gaps GP2 are periodically arranged on the first direction D1 with the second pitch PH2. The width W2 of each second gap GP2 on the first direction D1 is 1 micrometer to 10 micrometers. In some embodiments, the width W1 of the first gap GP1 on the first direction D1 is greater than or equal to the width W2 of the second gap GP2 on the first direction D1.

The width of each second optical unit 272 on the first direction D1 (that is, the second pitch PH2 minus the width W2) is 1 micrometer to 10 micrometers. In some embodiments, the first surfaces of the second optical units 272 facing the bank structure 230 are flat surfaces, and the second surfaces of the second optical units 272 facing the circuit substrate 100 are flat surface. The second optical units 272 have a uniformly distributed thickness.

In this embodiment, the encapsulate layer 300 extends to between the black matrix 110 and the second optical structure 270, and fills the second gaps GP2. In some embodiments, the encapsulate layer 300 contacts the bank structure 230 through the second gaps GP2.

Through the design of the second optical structure 270, the light emitted by the LED 120 undergoes refraction at the second optical structure 270 (similar to the principle of Fiber Bragg Grating, FBG). As a result, the direct transmission of light between the barrier structure 230 and the black matrix 110 may be reduced.

In some embodiments, the encapsulate layer 300 can be used as a glue layer and can be used to bond the upper structure to the lower structure. For example, in some embodiments, the lower structure includes the circuit substrate 100, the black matrix 110 and the LED 120, and the upper structure includes the opposite substrate 200, the light shielding layer 210, the first color filter element 222, the second color filter element 224, the third color filter element 226, the bank structure 230, the light transmission layer 240, the color conversion layer 250, the first optical structure 260 and the second optical structure 270. The lower structure and upper structure are formed separately. The encapsulation layer 300 is formed on the lower structure and used to connect the lower structure to the upper structure.

FIGS. 2A to 2D are schematic top views of optical structures of some embodiments according to the present invention. For example, the first optical structure 260 and/or the second optical structure 270 in FIG. 1 can be designed using the optical structures 400 shown in FIGS. 2A to 2D.

Figure 2A:
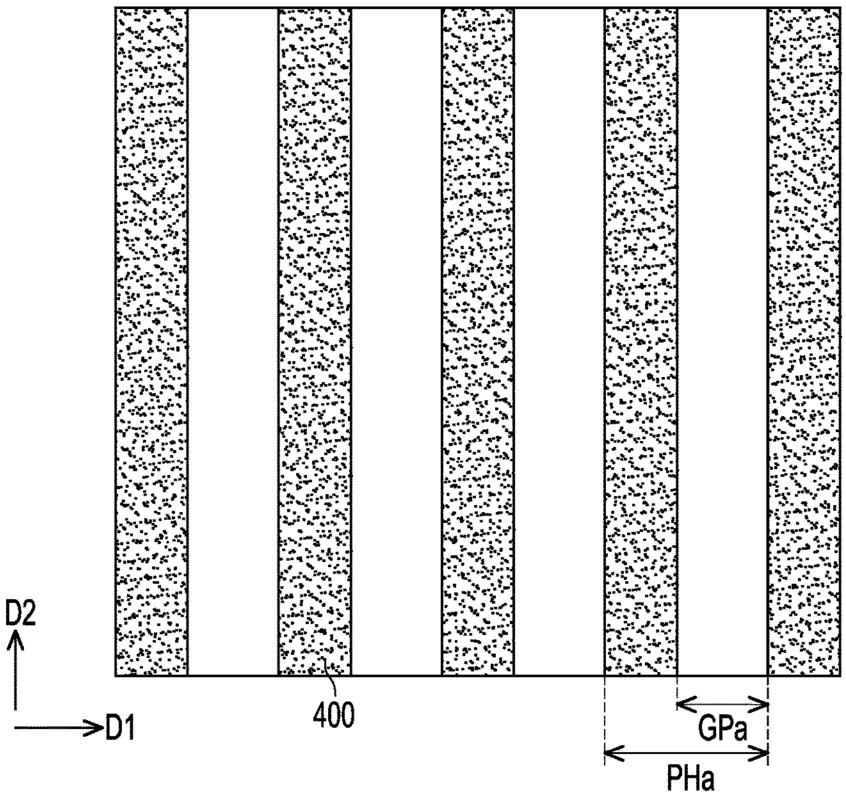
FIGS. 2A to 2D are schematic top views of optical structures of some embodiments according to the present invention.

In FIG. 2A, the optical structure 400 includes strip-shaped structures (strip-shaped optical units), and the optical structures 400 include a plurality of gaps GPa periodically arranged with pitch PHa on the first direction D1. The strip optical units extend along the second direction D2.

Figure 2B:
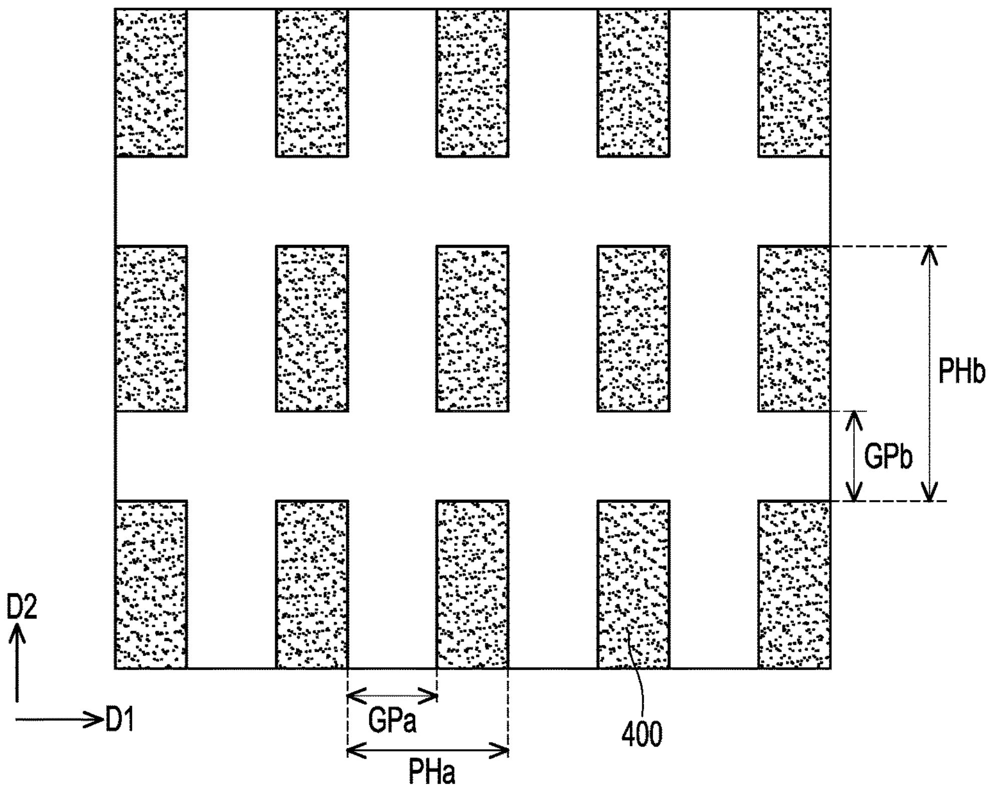

In FIG. 2B, the optical structure 400 includes a plurality of island structures (island optical units), and the optical structure 400 includes a plurality of gaps GPa periodically arranged with a pitch PHa on the first direction D1 and a plurality of gaps GPb arranged periodically with a pitch PHb on the second direction D2. The gaps GPa and the gaps GPb are connected to each other and form a network structure.

Figure 2C:
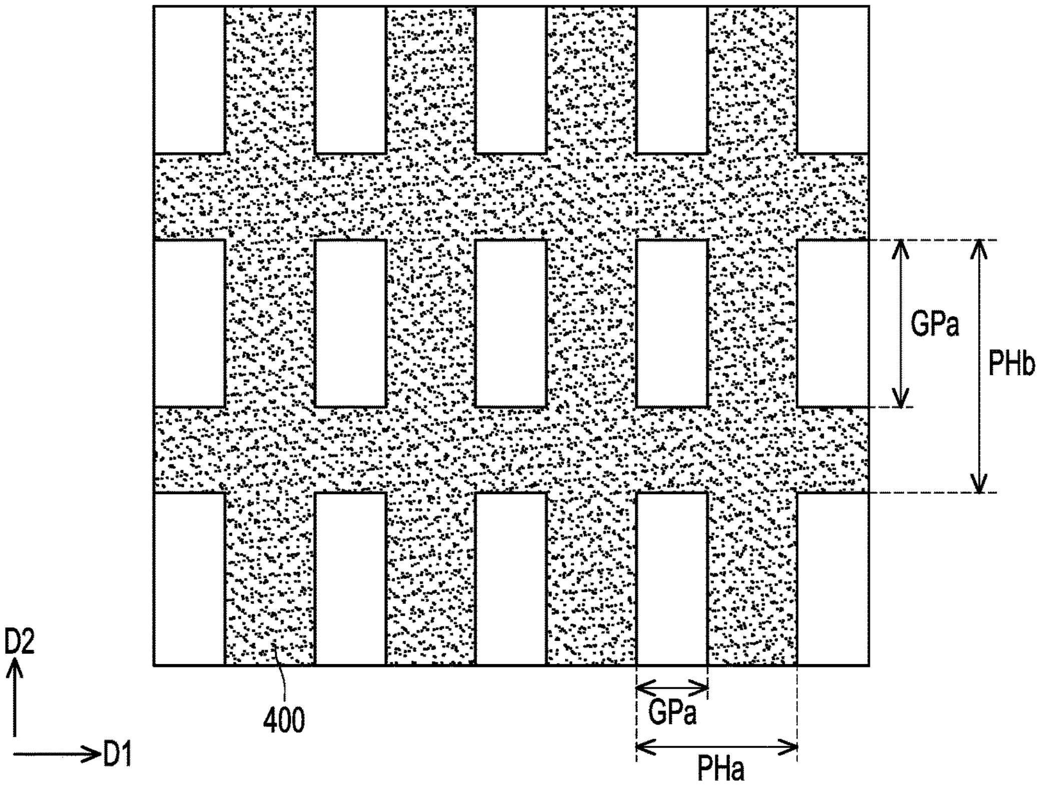

In FIG. 2C, the optical structure 400 is a mesh structure. The optical structure 400 includes a plurality of gaps GPa periodically arranged with a pitch PHa on the first direction D1, and the aforementioned gaps GPa are periodically arranged with a pitch PHb on the second direction D2.

Figure 2D:
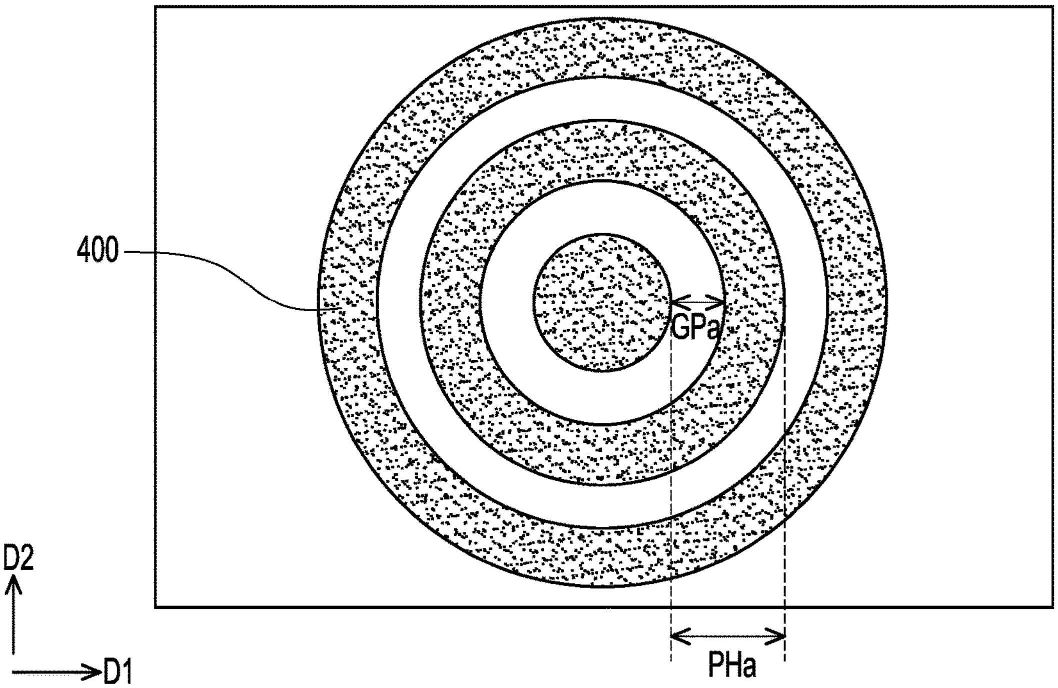

In FIG. 2D, the optical structure 400 is a concentric circular structure. The optical structure 400 includes a plurality of gaps GPa arranged periodically with a pitch PHa on the first direction D1 and on the second direction D2.

Figure 3:
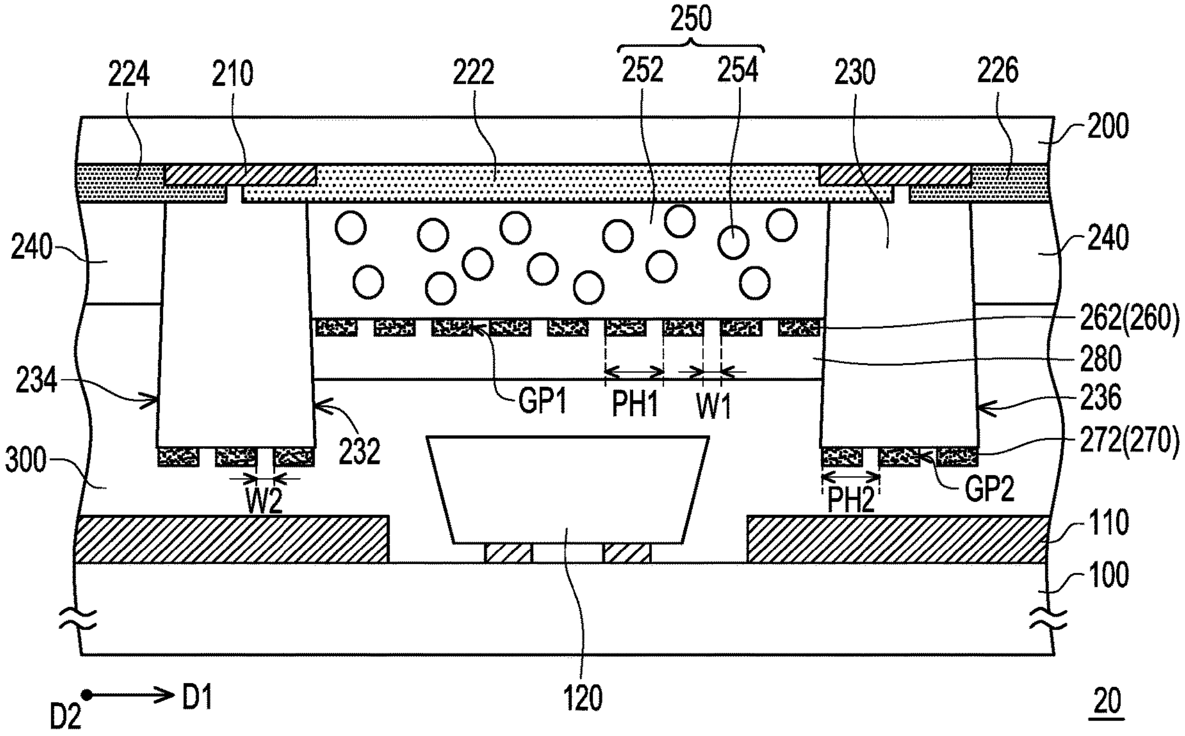
FIG. 3 is a schematic cross-sectional view of a display device of an embodiment according to the present invention.

FIG. 3 is a schematic cross-sectional view of a display device of an embodiment according to the present invention. It should be noted herein that, in embodiments provided in FIG. 3, element numerals and partial content of the embodiments provided in FIG. 1 are followed, the same or similar reference numerals being used to represent the same or similar elements, and description of the same technical content being omitted. For a description of an omitted part, reference may be made to the foregoing embodiment, and the descriptions thereof are omitted herein.

The main difference between the display device 20 in FIG. 3 and the display device 10 in FIG. 1 is that: the display device 20 further includes a covering layer 280.

The covering layer 280 is located on the encapsulate layer 300 and in the opening 232 of the bank structure 230. In this embodiment, the covering layer 280 is formed on the first optical structure 260, and the first optical structure 260 is located between the covering layer 280 and the color conversion layer 250.

In this embodiment, the covering layer 280 fills the first gaps GP1 of the first optical structure 260, and the encapsulate layer 300 fills the second gap GP2 of the second optical structure 270. The covering layer 280 contacts the color conversion layer 250 through the first gaps GP1, and the encapsulate layer 300 contacts the bank structure 230 through the second gaps GP2.

In some embodiments, the material of the covering layer 280 includes photoresist, resin, silicone or other suitable materials, and its refractive index is 1.2 to 1.6. The refractive index of the material of the first optical structure 260 and the refractive index of the material of the second optical structure 270 are greater than the refractive index of the material of the covering layer 280. In some embodiments, the refractive index of the material of the covering layer 280 is smaller than the refractive index of the material of the encapsulate layer 300.

Through the design of a plurality of first gaps GP1 arranged periodically, diffraction phenomena occur at the first optical structure 260 when light emitted by the LED 120 is transmitted. Therefore, it allows the light emitted by the LED 120 to be more completely converted into a different color by the color conversion layer 250, thus improving the issue of light leakage caused by the direct transmission of light through the color conversion layer 250. Based on the above, it is not necessary to make the color conversion layer 250 very thick in order to completely convert the light emitted by the LED 120 into the intended color. This enables the color conversion layer 250 to be thinner, resulting in material cost savings.

In some embodiments, the encapsulate layer 300 can be used as a glue layer and can be used to bond the upper structure to the lower structure. For example, in some embodiments, the lower structure includes the circuit substrate 100, the black matrix 110 and the LED 120, and the upper structure includes the opposite substrate 200, the light shielding layer 210, the first color filter element 222, the second color filter element 224, the third color filter element 226, the bank structure 230, the light-transmitting layer 240, the color conversion layer 250, the first optical structure 260, the second optical structure 270, and the covering layer 280. The lower structure and upper structure are formed separately. The encapsulation layer 300 is formed on the lower structure and used to connect the lower structure to the upper structure.

In addition, in the embodiment of FIG. 3, the first optical structure 260 and/or the second optical structure 270 can be designed using the optical structures 400 shown in FIGS. 2A to 2D.

Figure 4:
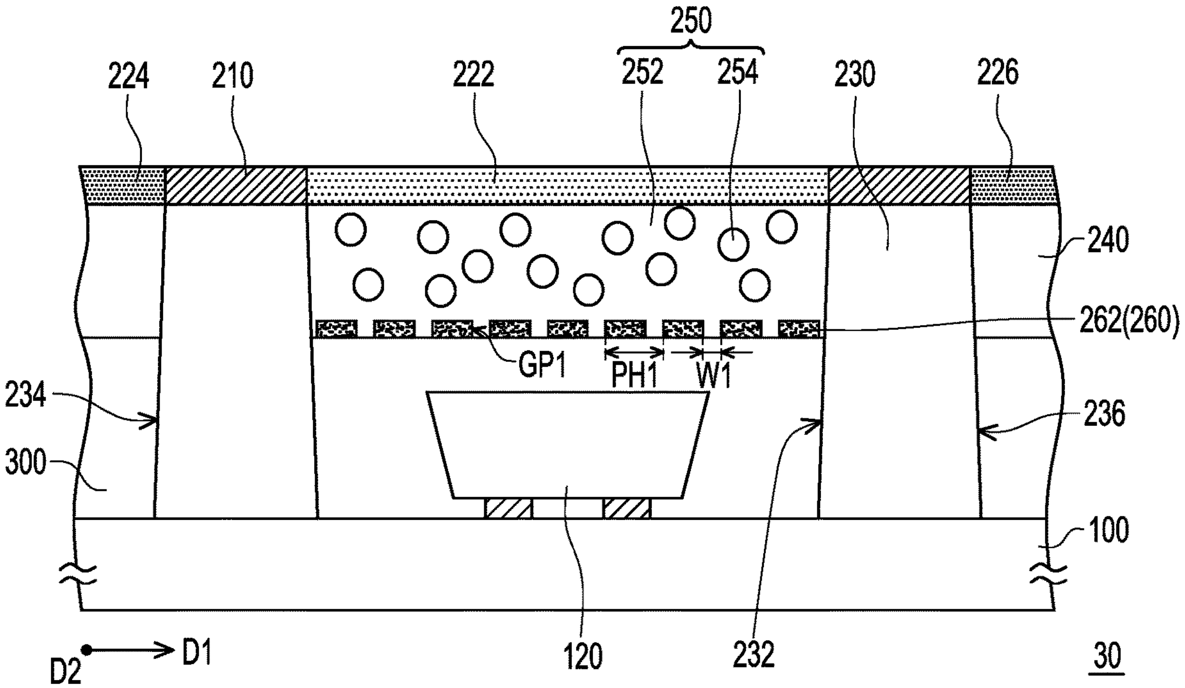
FIG. 4 is a schematic cross-sectional view of a display device of an embodiment according to the present invention.

FIG. 4 is a schematic cross-sectional view of a display device of an embodiment according to the present invention. It should be noted herein that, in embodiments provided in FIG. 4, element numerals and partial content of the embodiments provided in FIG. 1 are followed, the same or similar reference numerals being used to represent the same or similar elements, and description of the same technical content being omitted. For a description of an omitted part, reference may be made to the foregoing embodiment, and the descriptions thereof are omitted herein.

The main difference between the display device 30 in FIG. 4 and the display device 10 in FIG. 1 is that: the bank structure 230 of the display device 30 contacts the circuit substrate 100.

In this embodiment, after transferring the LED 120 to the circuit substrate 100, the bank structure 230 is formed on the circuit substrate 100. Then, the encapsulate layer 300 is formed in the openings 232, 234, 236 of the bank structure 230. Then, the first optical structure 260 is formed on the encapsulate layer 300. The refractive index of the material of the first optical structure 260 is greater than the refractive index of the material of the encapsulate layer 300 and the refractive index of the base material 252 of the color conversion layer 250.

After forming the first optical structure 260 on the encapsulate layer 300, the color conversion layer 250 is formed in the opening 232 of the bank structure 230, and the light-transmitting layer 240 is formed in the openings 234, 236 of the bank structure 230. The order of forming the color conversion layer 250 and the light-transmitting layer 240 can be adjusted according to requirements. Finally, a light shielding layer 210, a first color filter element 222, a second color filter element 224 and a third color filter element 226 are formed on the color conversion layer 250, the light-transmitting layer 240 and the bank structure 230.

In this embodiment, the bank structure 230 surrounds the color conversion layer 250, the encapsulate layer 300 and the first optical structure 260. In this embodiment, the color conversion layer 250 fills the first gaps GP1.

Through the design of a plurality of first gaps GP1 arranged periodically, diffraction phenomena occur at the first optical structure 260 when light emitted by the LED 120 is transmitted. Therefore, it allows the light emitted by the LED 120 to be more completely converted into a different color by the color conversion layer 250, thus improving the issue of light leakage caused by the direct transmission of light through the color conversion layer 250. Based on the above, it is not necessary to make the color conversion layer 250 very thick in order to completely convert the light emitted by the LED 120 into the intended color. This enables the color conversion layer 250 to be thinner, resulting in material cost savings.

In addition, in the embodiment of FIG. 4, the first optical structure 260 and/or the second optical structure 270 can be designed using the optical structures 400 shown in FIGS. 2A to 2D.

Figure 5:
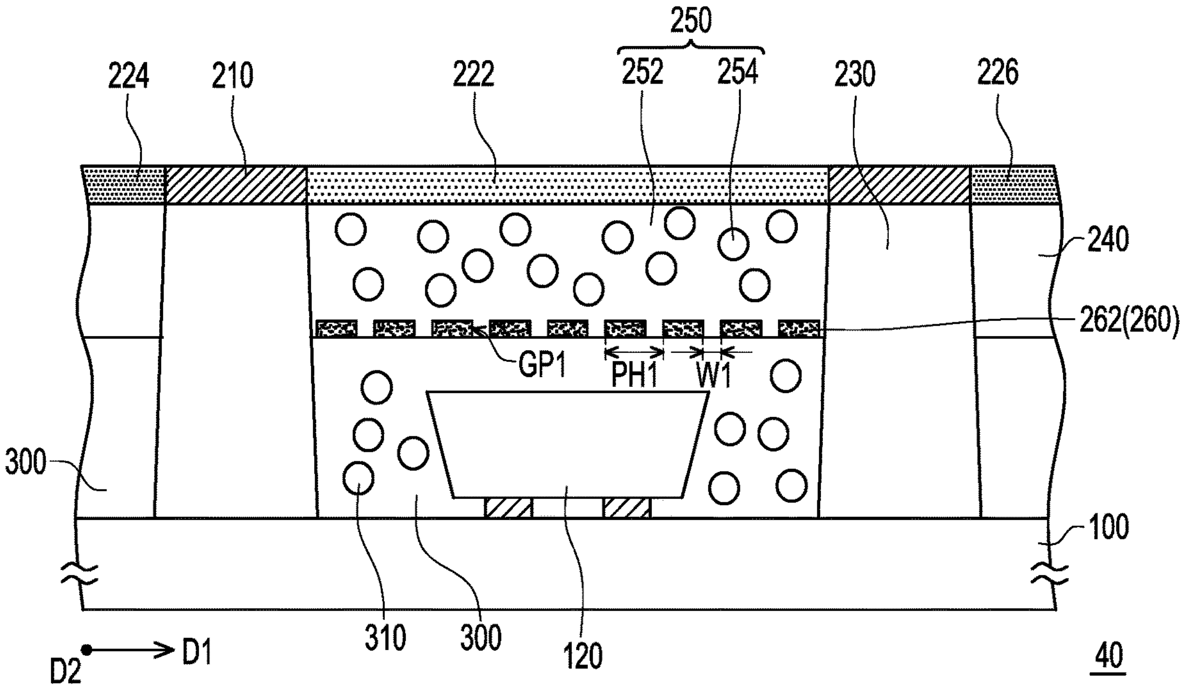
FIG. 5 is a schematic cross-sectional view of a display device of an embodiment according to the present invention.

FIG. 5 is a schematic cross-sectional view of a display device of an embodiment according to the present invention. It should be noted herein that, in embodiments provided in FIG. 5, element numerals and partial content of the embodiments provided in FIG. 4 are followed, the same or similar reference numerals being used to represent the same or similar elements, and description of the same technical content being omitted. For a description of an omitted part, reference may be made to the foregoing embodiment, and the descriptions thereof are omitted herein.

The main difference between the display device 40 in FIG. 5 and the display device 30 in FIG. 4 is that: the display device 40 further includes color conversion particles 310 dispersed in the encapsulate layer 300.

In this embodiment, the color conversion layer 250 includes a base material 252 and a plurality of color conversion particles 254 dispersed in the base material 252. The color conversion particles 310 and the color conversion particles 254 include, for example, the same material, and the encapsulate layer 300 and the base material 252 include, for example, the same material.

Figure 6:
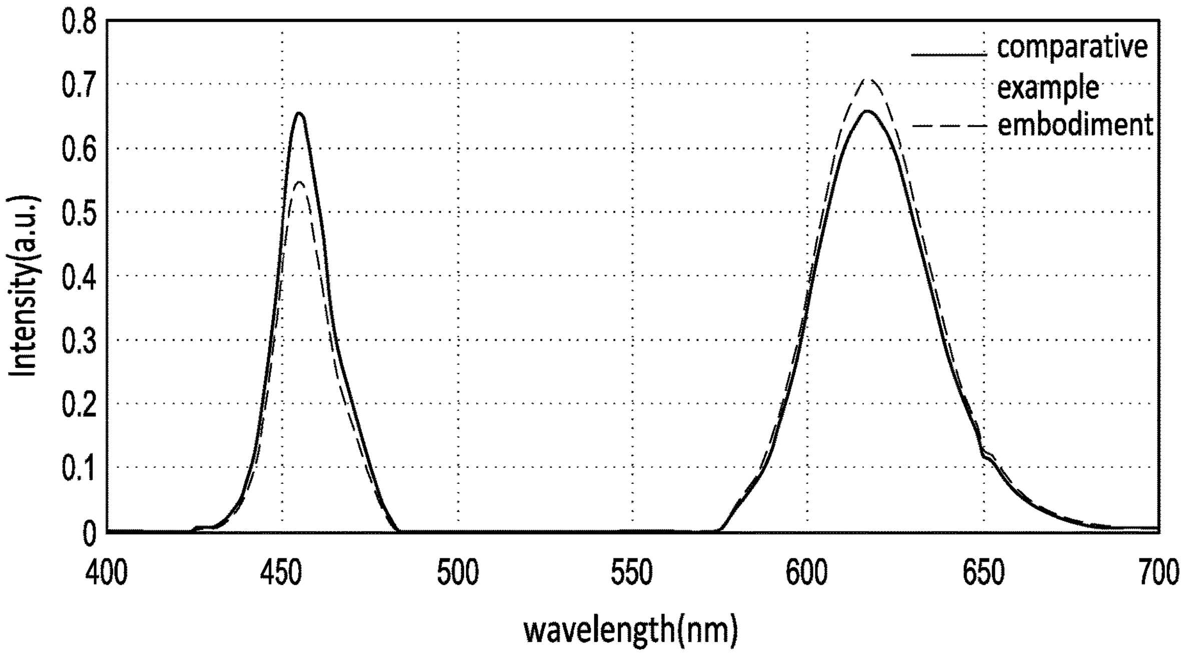
FIG. 6 is a light intensity distribution diagram of different wavelengths of a display device of an embodiment according to the present invention and a display device of a comparative example.

FIG. 6 is a light intensity distribution diagram of different wavelengths of a display device of an embodiment according to the present invention and a display device of a comparative example. FIG. 6 shows the light intensity distribution diagram of different wavelengths after the light passes through the color conversion layer 250 and does not pass through the first color filter element 222.

In FIG. 6, the structure of the display device of the embodiment is shown in FIG. 1, the color conversion layer 250 is used to convert the blue light emitted by the LED 120 into red light, and its thickness is 12 micrometers, the refractive index of the encapsulate layer 300 is about 1.6, and the first optical structure 260 and the second optical structure 270 are indium tin oxide (the thickness is about 0.2 micrometers, and the refractive index is about 2.2), the width of the first gaps GP1 and the second gaps GP2 on the first direction D1 is about 3 micrometers, the width of the first optical units 262 and the second optical units 272 on the first direction D1 is about 3 micrometers.

In FIG. 6, the display device of the comparative example is similar to the display device of the embodiment, the difference is that the display device of the comparative example does not have the first optical structure 260 and the second optical structure 270.

From FIG. 6, it can be observed that the configuration of the first optical structure 260 and the second optical structure 270 helps reduce the intensity of blue light passing through the color conversion layer 250 and enhances the intensity of light converted into red light by the color conversion layer 250.

Figure 7:
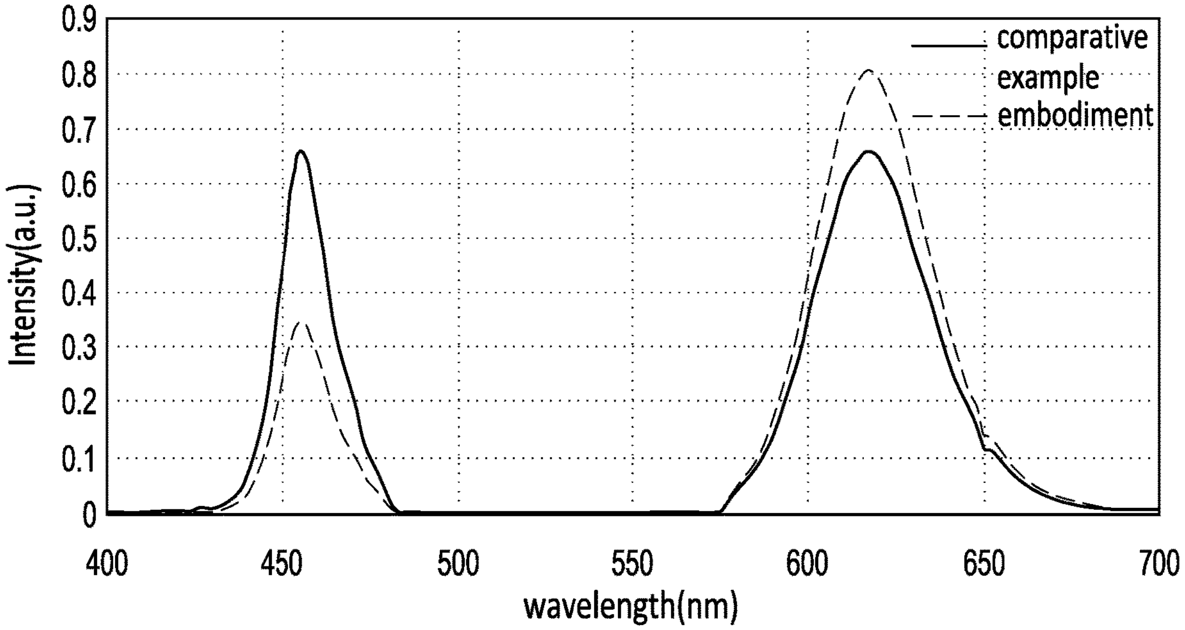
FIG. 7 is a light intensity distribution diagram of different wavelengths of a display device of an embodiment according to the present invention and a display device of a comparative example.

FIG. 7 is a light intensity distribution diagram of different wavelengths of a display device of an embodiment according to the present invention and a display device of a comparative example. FIG. 7 shows the light intensity distribution diagram of different wavelengths after the light passes through the color conversion layer 250 and does not pass through the first color filter element 222.

In FIG. 7, the structure of the display device of the embodiment is shown in FIG. 3, the color conversion layer 250 is used to convert the blue light emitted by the LED 120 into red light, and its thickness is 12 micrometers, the refractive index of the covering layer 280 is about 1.22, and the first optical structure 260 and the second optical structure 270 are indium tin oxide (the thickness is about 0.2 micrometers, and the refractive index is about 2.2), the width of the first gaps GP1 and the second gaps GP2 on the first direction D1 is about 3 micrometers, the width of the first optical units 262 and the second optical units 272 on the first direction D1 is about 3 micrometers.

In FIG. 7, the display device of the comparative example is similar to that of the embodiment, the difference is that the display device of the comparative example does not have the first optical structure 260, the second optical structure 270 and the covering layer 280. In other words, the display device of the comparative example of FIG. 7 has the same structure as the display device of the comparative example of FIG. 6.

From FIG. 7, it can be observed that the configuration of the first optical structure 260, the second optical structure 270 and the covering layer 280 helps reduce the intensity of blue light passing through the color conversion layer 250 and enhances the intensity of light converted into red light by the color conversion layer 250. In addition, comparing the embodiment of FIG. 6 with the embodiment of FIG. 7, it can be seen that the efficiency of the color conversion layer 250 can be further improved by disposing the covering layer 280 with a lower refractive index.

What is claimed is:

1. A display device, comprising:

a circuit substrate;

a light emitting diode, located on the circuit substrate;

an encapsulate layer, covering the light emitting diode;

a color conversion layer, overlapping with the light emitting diode; and a first optical structure having a thickness of 0.1 micrometer to 1 micrometer, overlapping with the color conversion layer and located between the encapsulate layer and the color conversion layer, wherein the encapsulate layer is located between the light emitting diode and the first optical structure, wherein the first optical structure comprises first gaps periodically arranged with a first pitch on a first direction, and a width of each first gap on the first direction is 1 micrometer to 10 micrometer, and a refraction index of a material the first optical structure is greater than a refraction index of a material of the encapsulate layer.

2. The display device of claim 1, further comprising a bank structure, surrounding the color conversion layer;

a black matrix, located between the circuit substrate and the bank structure, and surrounding the light emitting diode;

a second optical structure, located between the bank structure and the black matrix, wherein the second optical structure comprises second optical units periodically arranged with a second pitch on the first direction, and adjacent ones of the second optical units have a second gap.

3. The display device of claim 2, wherein a width of the second gap on the first direction is 1 micrometer to 10 micrometers.

4. The display device of claim 2, wherein the width of the first gaps on the first direction is greater than or equal to the width of the second gap on the first direction.

5. The display device of claim 2, wherein the encapsulate layer extends between the black matrix and the second optical structure.

6. The display device of claim 1, wherein the material of the first optical structure is a transparent material.

7. The display device of claim 1, wherein the first optical structure comprises first optical units arranged periodically, and the first gaps are located between adjacent ones of the first optical units, first surfaces of the first optical units facing the color conversion layer are flat surfaces, and second surfaces of the first optical units facing the circuit substrate are flat surfaces.

8. The display device of claim 1, wherein the encapsulate layer fills into the first gaps.

9. The display device of claim 8, wherein the encapsulate layer is in contact with the color conversion layer through the first gaps.

10. The display device of claim 1, further comprising a bank structure surrounding the color conversion layer, the encapsulate layer and the first optical structure, and the bank structure is in contact with the circuit substrate.

11. The display device of claim 1, further comprising:

first color conversion particles, dispersed in the encapsulate layer, and wherein the color conversion layer comprises a base material and second color conversion particles dispersed in the base material.

12. The display device of claim 1, wherein the color conversion layer fills into the first gaps.

13. The display device of claim 1, wherein light emitted by the light emitting diode sequentially transmits through the encapsulate layer, the first gaps of the first optical structure and the color conversion layer.

14. A display device, comprising:

a circuit substrate;

a light emitting diode, located on the circuit substrate;

an encapsulate layer, covering the light emitting diode;

a covering layer, located on the encapsulate layer;

a color conversion layer, overlapping the light emitting diode; and a first optical structure having a thickness of 0.1 micrometer to 1 micrometer, overlapping the color conversion layer and located between the covering layer and the color conversion layer, wherein the encapsulate layer is located between the light emitting diode and the first optical structure, wherein the first optical structure comprises first gaps periodically arranged with a first pitch on a first direction, and a width of each first gap on the first direction is 1 micrometer to 10 micrometers, and a refractive index of a material of the first optical structure is greater than a refractive index of a material of the covering layer.

15. The display device of claim 14, further comprising
a bank structure, surrounding the color conversion layer;
a black matrix, located between the circuit substrate and the bank structure and surrounding the light emitting diode;
a second optical structure, located between the bank structure and the black matrix, wherein the second optical structure comprises second gaps arranged periodically with a second pitch on the first direction.

16. The display device of claim 15, wherein the encapsulate layer extends between the black matrix and the second optical structure.

17. The display device of claim 15, wherein the covering layer fills into the first gaps, and the encapsulate layer fills into the second gaps.

18. The display device of claim 17, wherein the covering layer is in contact with the color conversion layer through the first gaps.

19. The display device of claim 14, wherein the first optical structure comprises first optical units arranged periodically, and the first gaps are located between adjacent ones of the first optical units, first surfaces of the first optical units facing the color conversion layer are flat surfaces, and second surfaces of the first optical units facing the circuit substrate are flat surfaces.

20. The display device of claim 14, wherein light emitted by the light emitting diode sequentially transmits through the encapsulate layer, the first gaps of the first optical structure and the color conversion layer.

* * * * *